UNITED STATES PATENT OFFICE.

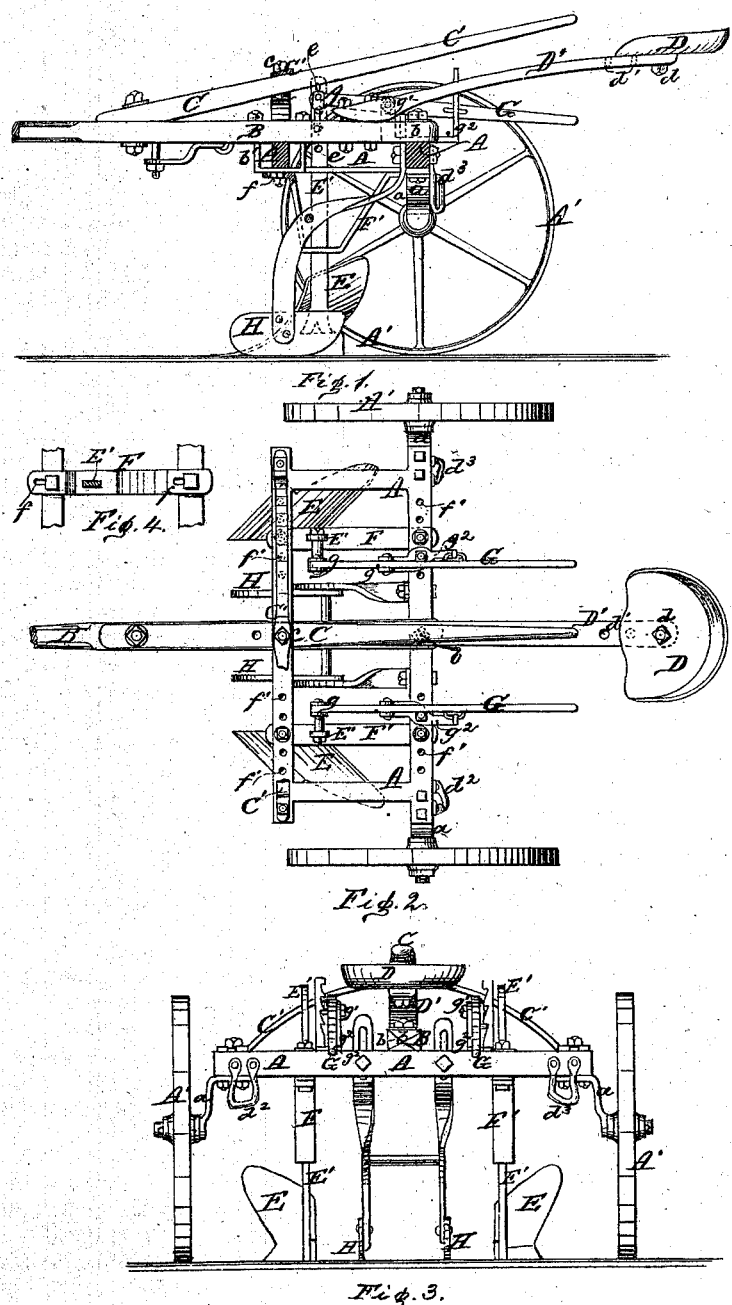

GUSTAVUS D. BROWN, OF LEBANON, ILLINOIS.

IMPROVEMENT IN CORN-CULTIVATORS.

Specification forming part of Letters Patent No. 115,427, dated May 30, 1871.

*To all whom it may concern:*

Be it known that I, GUSTAVUS D. BROWN, of Lebanon, in the county of St. Clair and State of Illinois, have made certain new and useful Improvements in Corn-Cultivators; and I do hereby declare that the following is a full and true description thereof, reference being had to the accompanying drawing and to the letters of reference marked thereon.

This invention consists chiefly in a new arrangement and combination of parts to achieve the lateral movement of the plow-frame and plows, to gage the depths of said plows, as well as to the manner of laterally adjusting said plows to the plow-frame, all of which will now more fully be described.

To enable those herein skilled to make and use my said improvements, I will now more fully describe the same, referring to the accompanying—

Figure 1 as a sectional elevation; to Fig. 2 as a top plan; to Fig. 3 as a rear-end view; to Fig. 4 as a detail part plan of the standard-guides.

I support the rectangular frame A on wheels A' by sub-axles $a$, bolted properly. Said plow-frame I further pivot to the tongue B at $b$, the front timber working in a guide-strap, $b'$, bolted to said tongue. On top the tongue or draft-pole B I pivot a hand-lever, C, having its fulcrum pivoted at $c$ to a segmental bar, C', bolted to the front timber of the frame A, as shown in Figs. 1 and 3. The lever C extends back within operative reach of the driver's seat. By means of said hand-lever the operator or plowman is readily enabled to guide the frame and its plows laterally, in accordance with crooked or irregular rows of corn. The seat D I secure adjustably, by means of bolts $d$ and holes $d^1$, to a rear projecting bar, D', as shown in Figs. 1 and 2. In order, however, that said seat may be raised or lowered, I have arranged the seat-bar D' convex at one end, (where it connects with the tongue B,) being secured by proper bolts, in manner clearly indicated in Fig. 1. The plow-frame A has two stirrups, $d^2$ $d^3$, for the feet of the plowman.

It will be observed that as the plowman can vary the position of the seat, raise and lower the same, he can suit his weight accordingly, plow evenly, and assist by his feet to guide the frame carrying the plows laterally, as the case requires. The plows E are connected to the frame A, their standards E' passing through slotted standard-guides F F', constructed and bolted to the frame A, as shown in Fig. 1.

To adjust the plow-points as required, the standard-strap F on each end has a slot, $f$, as shown in detail, Fig. 4. Furthermore, in order that said standard-guides F F', with the plows E, can be adjusted and secured in varying lateral positions, I provide the frame A with a series of holes, $f'$, as shown in Fig. 2.

To gage the depth of the plows E their standards E', at their upper ends, are connected to the hand-levers G by swivel-joints $g$, said levers having their fulcrum at $g^1$ on the ratchet-standard $g^2$, bolted to the frame A, and in which said levers engage and are held in any required position. The plows E are furthermore adjusted vertically by a series of holes, $e$, at their upper standard ends, in which the swivel-joints $g$ can be properly inserted and secured.

To prevent the young corn from being covered by plowing, I have arranged the plow-guides H, and secured the same adjustably to the plow-frame A, in manner indicated in Figs. 1 and 3. The plows can readily be arranged to deposit the ground against the guides H or from the same, as required, by simply reversing the position of the plows.

I do not claim the manner of guiding the cultivator by leverage on the tongue, and all the other parts separately considered and arranged; but What I do claim is—

In a cultivator, the arrangement of standard-guides F F' having slots $f$, plows E, standards E' having holes $e$, hand-levers G, ratchet-standard $g^2$, plow-frame A having holes $f'$, tongue B, hand-bar C, segmental bar C', seat-bar D', and seat D made adjustable, when all said parts are constructed to operate as described.

In testimony of said invention I have hereunto set my hand.

GUSTAVUS D. BROWN.

Witnesses:
WM. BLACK,
JAMES RANKIN.